(No Model.) 2 Sheets—Sheet 2.
R. E. POINDEXTER.
CORN SPLITTING MACHINE.
No. 498,887. Patented June 6, 1893.
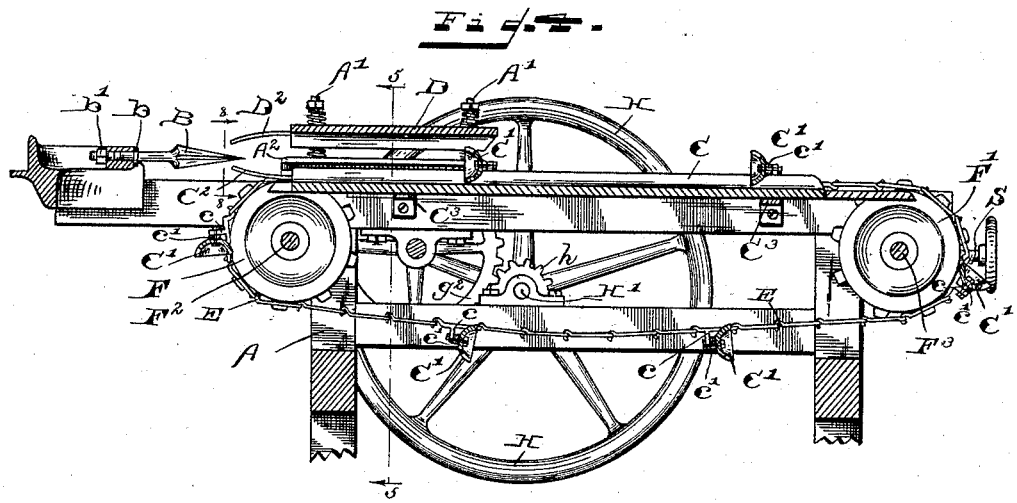
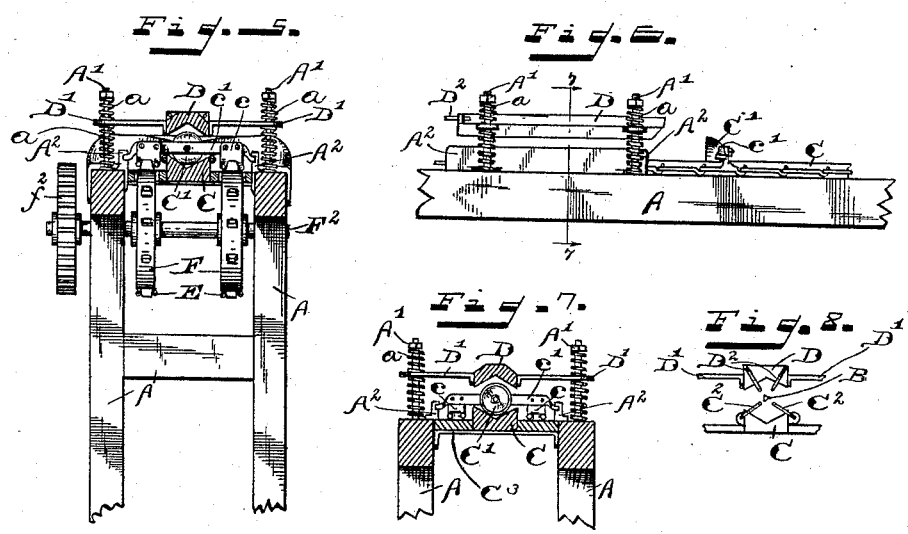
WITNESSES:
F. W. Warner
J. A. Walsh
INVENTOR
Robert E. Poindexter,
per Chester Bradford,
ATTORNEY.

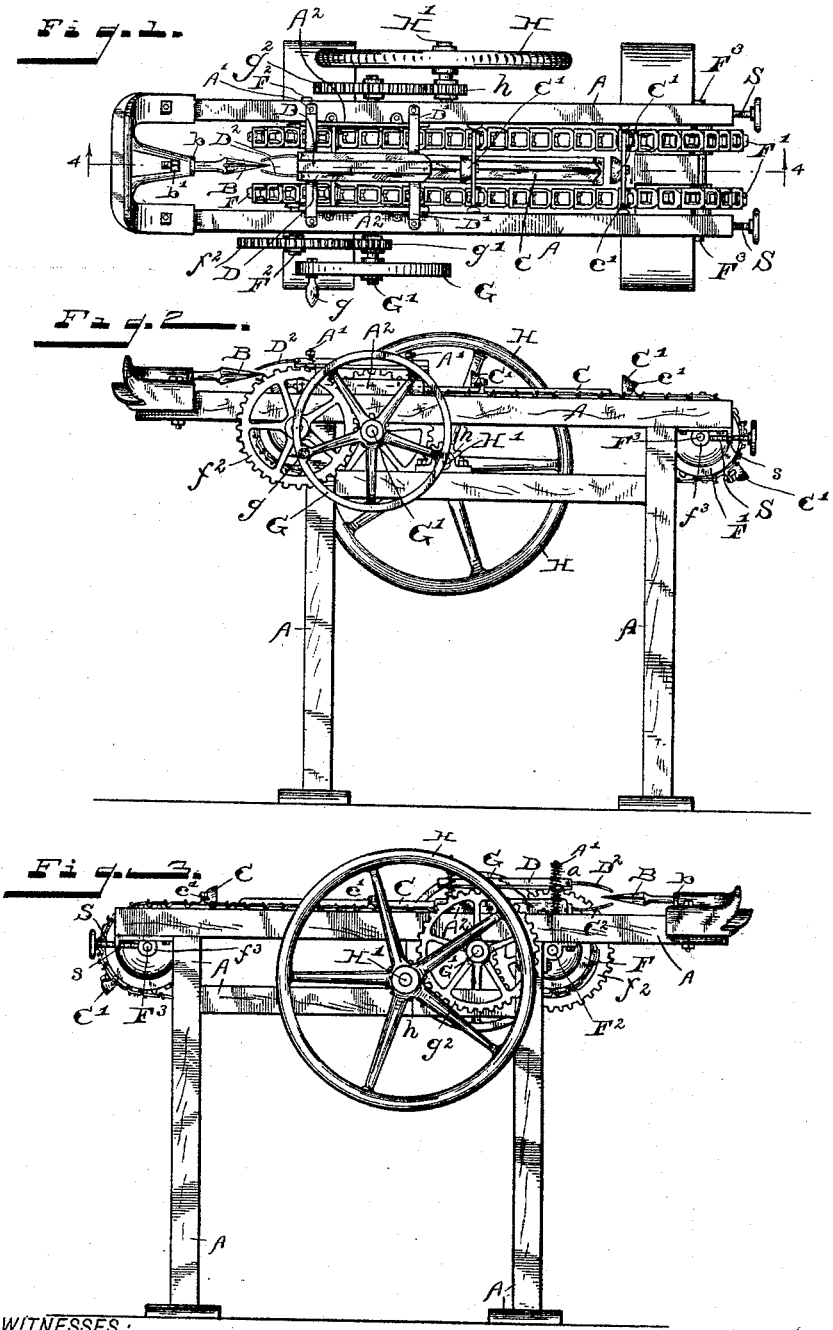

UNITED STATES PATENT OFFICE.

ROBERT E. POINDEXTER, OF INDIANAPOLIS, INDIANA.

CORN-SPLITTING MACHINE.

SPECIFICATION forming part of Letters Patent No. 498,887, dated June 6, 1893.

Application filed July 30, 1892. Serial No. 441,652. (No model.)

*To all whom it may concern:*

Be it known that I, ROBERT E. POINDEXTER, a citizen of the United States, residing at Indianapolis, in the county of Marion and State of Indiana, have invented certain new and useful Improvements in Corn-Splitting Machines, of which the following is a specification.

My said invention consists in certain improvements upon that for which Letters Patent of the United States No. 429,794 were issued to me, dated June 10, 1890, whereby the efficiency and capacity of said machine are increased, as will be hereinafter more particularly described and claimed.

Referring to the accompanying drawings, which are made a part hereof, and on which similar letters of reference indicate similar parts, Figure 1 is a top or plan view of the machine embodying my said invention; Fig. 2 an elevation of one side thereof; Fig. 3 an elevation of the other side; Fig. 4 a central sectional view of the upper portion, embodying the mechanism, on a somewhat enlarged scale, as seen from the dotted line 4 4 in Fig. 1; Fig. 5 a transverse sectional view looking toward the left from the dotted line 5 5 in Fig. 4; Fig. 6 a detail elevation illustrating more fully the construction of the guide; Fig. 7 a transverse sectional view of said guide separately, similar to a portion of Fig. 5, but looking in the other direction from the dotted line, and Fig. 8 a detail front elevation of said guide, showing the spring wires or fingers in which it terminates.

In said drawings the portions marked A represent the frame-work of the machine; B the spear or splitting device; C the bed-plate which also forms the lower side of the guide; D the upper guide; E the chain belts upon which the carriers are mounted; F F' the wheels over which said carrier chains run; G the main driving wheel, and H a fly-wheel.

The frame A is in all essential particulars like that shown in the aforementioned Letters Patent, and differs only in details of construction. The spear B is also much the same, but is now made removable, and is secured in its mounting, between a collar $b$ and a nut $b'$, which enables it to be removed and replaced at pleasure. This is of advantage in case the spear should become dull, in sharpening, or become broken and needs to be replaced with another.

The bed-plate C is grooved or hollowed on its upper side in cross section, as shown most plainly in Figs. 5 and 7. The ears of corn are delivered onto this bed-plate, and lie in said groove lengthwise, and are carried forward on said bed-plate by the carriers to against the spear, by which they are split, as in the machine of the aforementioned patent. Said bed-plate is strongly mounted on the frame A by cross-bars $C^3$, or otherwise. At its front portion it forms one-half of the guide by which the ear of corn while being split is held properly to place.

The upper half D of the guide is formed like an inverted portion of the bed-plate C. It is carried by arms D' which extend out and pass over standards A' on the frame-work, and are held at the predetermined level by coiled springs $a$ arranged above and below said arms D'. By means of said springs said guide D is enabled to move vertically as much as may be desired, thus adapting the machine to hold ears of corn of varying size, and guide them properly to the splitting spear. Upon the front ends of these parts C and D are springs $C^2$ and $D^2$ which extend forward to a point a little past the point of the splitting spear, and thus surround said point. These springs are preferably of wire, and converge toward each other at the extreme ends. They are thus adapted to yield and guide the ear of corn up to the point where it is actually split, while their small size does not prevent the pieces from falling away from the splitting spear when the work of splitting is finished. The lower ones also provide a certain measure of yielding on the under as well as the other side, thus tending to guide the ears of corn so that their centers will strike the point of the splitting spear, notwithstanding variations in the sizes of said ears. These springs, therefore, while not essential, are an important feature of my present invention.

The chains E run over the wheels F and F', and are driven by suitable mechanism, as will be presently described. The carriers C' are mounted thereon in such numbers as may be desired, the number being mainly determined by the length of the machine, and the consequent length of the chains. Six of said carriers are shown. It being preferable that there should be two chains, so that the bed-plate need not be divided, the carriers are mounted on cross-bars $c'$ which extend from one chain to the other, and which are secured to standards $c$ on the links of said chain. Said cross-bars $c'$ are preferably flattened at their ends, and at about the point where they pass under the upper guide D, enter grooves in guide-plates $A^2$ secured to the frame A, and the carrier is thus more accurately guided during the final or splitting operation of the machine. The carriers C' are preferably cup-shaped in form to receive the end of the ear and prevent it from escaping therefrom while being pushed forward.

The wheels F and F' are ordinary sprocket wheels, and are mounted, respectively, on the shafts $F^2$ and $F^3$. The shaft $F^2$ is driven, through the spur gear-wheel $f^2$ thereon and a pinion $g'$ on the main driving shaft, from said main driving shaft. The shaft $F^3$ is an idle shaft, and is mounted in bearings $f^3$ which are adjustable by means of the screws S which are mounted in bearings $s$ on the frame-work, by which means the proper tension of the chains is secured. Said screws ordinarily have hand-wheels, as shown, whereby they may be operated, but, of course, may be operated by any desired means.

The main driving wheel G is shown in the form of a pulley, and is usually operated by a belt. It is also shown as provided with a handle, $g$, by which it may be turned by hand when desired. It is mounted upon the main driving shaft G', and upon this shaft is the pinion $g'$ through which and the spur gear-wheel $f^2$ the shaft $F^2$ is driven, and upon the other end the spur gear-wheel $g^2$ through which and the pinion $h$ the shaft H' is driven.

The fly-wheel H is an ordinary fly-wheel for regulating the speed and power of the machine. It is mounted upon the shaft H', and is driven from the main guiding shaft, through gear-wheels, as has just been stated.

As will be readily understood from the drawings and the foregoing description, my present invention is mainly to secure a continuous feed, and thus largely increase the capacity of the machine. By means of the endless chains, with the carriers attached thereto, the ears of corn may be deposited one after another in front of said carriers, and the machine thus kept in continuous operation. The guides which have been added lend certainty, and various other of the details of construction assist in making the machine as a whole more perfect and complete.

Having thus fully described my said invention, what I claim as new, and desire to secure by Letters Patent, is—

1. The combination, in a corn splitting machine, of the spear or splitting device, and the endless chain carriers whereby ears of corn are continually driven against said spear, and split, substantially as set forth.

2. The combination, in a corn splitting machine, of the spear, a bed-plate, and an endless carrier traveling over said bed-plate, whereby the ears of corn are carried forward.

3. The combination, in a corn splitting machine, with the spear and the carrier, of a bed-plate hollowed or grooved, the groove being provided to receive the ears of corn and sustain and guide them while being carried forward to be split, substantially as set forth.

4. The combination, in a corn splitting machine, of the splitting device, the carrier, the bed-plate which also serves as a guide portion, and a second guide portion mounted over said bed-plate, substantially as set forth.

5. The combination, in a corn splitting machine, of the splitting device, the carrier, the bed-plate, which also forms a guide portion, and a second guide-portion mounted above said bed-plate by means of standards and springs, whereby it is enabled to yield and adjust itself to the varying sizes of the ears of corn.

6. The combination, in a corn splitting machine, of a splitting device, carrier and guides, one of said guides D being mounted on standards with springs above and below its arms, whereby it is given the desired yielding and automatic adjustment to the varying sizes of ears of corn, substantially as set forth.

7. In a corn splitting machine, the combination with a splitting device and a carrier, of a guide having forwardly-extending spring fingers or wires whereby the ears of corn are guided quite to the point of the splitting device, substantially as set forth.

8. The combination, in a corn splitting machine, of the splitting device, the traveling carrier, and grooved guide-plates $A^2$ with which suitable projections on said traveling carrier will engage, and whereby the said traveling carrier is exactly guided during the operation of the splitting.

In witness whereof I have hereunto set my hand and seal, at Indianapolis, Indiana, this 27th day of July, A. D. 1892.

ROBERT E. POINDEXTER. [L. S.]

Witnesses:
CHESTER BRADFORD,
J. A. WALSH.